Patented Dec. 2, 1941

2,264,682

UNITED STATES PATENT OFFICE 2,264,682

REDDISH-VIOLET SUBSTANTIVE AZO DYE

Joseph H. Trepagnier, Wilmington, Del., assignor to E. I. du Pont de Nemours & Company, Wilmington, Del., a corporation of Delaware No Drawing. Application June 21, 1941, Serial No. 399,232

4 Claims. (Cl. 260—145)

This invention relates to a new substantive reddish-violet tetrakisazo dyestuff which is suitable for dyeing cellulosic fibers, such as cotton and regenerated cellulose rayon.

In United States patent application Serial No. 293,568, certain tetrakisazo dyestuffs of the type A←Y←X→Y→A are described in one of which A is 1,3-dihydroxy benzene, Y is 2-(4'-amino-3'-sulfo-phenyl-amino)-8-naphthol-6-sulfonic acid and X is 4,4'-diamino-diphenyl-methane. This dye gives direct dyeings on regenerated cellulose rayon in bright shades of brown after having been given a formaldehyde aftertreatment. It has now been discovered by using as the X component, 4,4' - dimethoxy-3,3'-diamino-diphenyl-methane instead of 4,4'-diamino-diphenyl-methane, and by using as the Y component, 2-(4'-amino - 3' - sulfo-phenyl-amino)-5-naphthol-7-sulfonic acid, instead of the corresponding 8-naphthol-6-sulfonic acid used in the disclosed dye, that the dyeings are a reddish-violet shade and that they have far better discharge properties than the dyestuffs of similar shade which are disclosed in the application. This dyestuff is also distinguished by its high tinctorial power and excellent affinity.

It is among the objects of the invention to provide a direct tetrakisazo dyestuff suitable for dyeing cellulosic materials which gives dyeings having excellent washing fastness when aftertreated with formaldehyde in bright reddish-violet shades and which gives surprisingly white discharges when discharged by neutral or alkaline medium. Other objects of the invention will be apparent from the following description.

The objects of the invention are attained by coupling two moles of 2-(4'-amino-3'-sulfo-phenyl-amino)-5-naphthol-7-sulfonic acid with one mole of tetrazotized 4,4'-dimethoxy-3,3'-diamino-diphenyl methane, then tetrazotizing the product of coupling and coupling with two moles of 1,3-dihydroxy benzene. Formaldehyde treated dyeings on regenerated cellulose rayon from aqueous solutions of the dye are a bright reddish-violet shade. They have excellent fastness properties and superior discharge properties.

As illustrative of the manner of carrying out the invention, a slurry of 128.5 parts of 4,4'-dimethoxy-3,3'-diamino-diphenyl-methane in 200 parts of water was prepared. The amine was then dissolved by adding 91 parts of 100% hydrochloric acid as a 30% solution. The solution was cooled to 0° C. by adding crushed ice and 69 parts of 100% sodium nitrite as a 30% solution was added slowly. To complete the tetrazotization, a temperature of 5°±2° C. and a slight excess of nitrite were maintained for one-half hour after all of the nitrite had been added.

A solution which was strongly alkaline to Brilliant Yellow paper was made by adding 424 parts of sodium carbonate to a slurry of 410 parts of 2-(4'-amino-3'-sulfo-phenyl-amino)-5-naphthol-7-sulfonic acid in 5000 parts of water. The solution was cooled to 0° C. by adding crushed ice.

The tetrazo was slowly added to the alkaline solution of the coupling component while maintaining a temperature of 5°±2° C., alkalinity to Brilliant Yellow paper and an excess of 2-(4'-amino - 3' - sulfo-phenyl-amino)-5-naphthol-7-sulfonic acid. The suspension was stirred for one hour after the addition of the tetrazo, heated to 60°–70° C., salted 10% with sodium chloride and filtered.

The filter cake was mixed with approximately 4000 parts of water until a smooth slurry was obtained. The slurry was cooled to 10°–15° C. by adding ice and then a 30% solution of hydrochloric acid containing approximately 138 parts of 100% hydrochloric acid was added.

A 30% solution containing 69 parts of 100% sodium nitrite was added to the slurry and the tetrazotization was carried at 10°–15° C. for about one hour while maintaining a distinct excess of nitrite.

A solution was made by stirring 132 parts of 1,3-dihydroxy benzene with 2000 parts of water. The solution was cooled to 0° C. by adding crushed ice and 370 parts of sodium carbonate were added.

The tetrazo was slowly added to the alkaline solution of 1,3-dihydroxy benzene. An excess of 1,3-dihydroxy benzene and an alkalinity to Brilliant Yellow was maintained. The suspension was stirred one hour after the addition of the tetrazo and heated to 55°–60° C. Approximately 183 parts of 100% hydrochloric acid were then added until the suspension was distinctly acid to Congo Red paper (pH=2.0). The dyestuff was filtered from the acid suspension and dried at 80° C. The product was a dry dark colored powder and is represented in the form of its acid by the formula

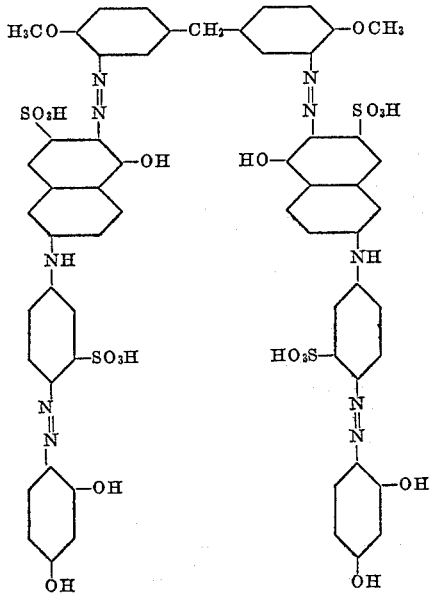

A dyebath was made by dissolving 0.2 gram of the above described product in 50 cc. of water at 190°–200° F., adding 0.4 gram of sodium carbonate to assist the solution, diluting with water to a total volume of 500 cc., the water being at approximately 160° F. and then adding 40 cc. of a 10% solution of Glauber's salt. A 10 gram piece of regenerated cellulose rayon was wet out with water, squeezed partially dry and entered into the dyebath. The temperature of the dyebath was raised to 180°–190° F. in the course of fifteen minutes and the piece was held in the dyebath at that temperature for one hour with stirring at frequent intervals. At the end of one hour, the dyeing was removed and rinsed in cold water.

The rinsed dyeing from the above operation was entered into 500 cc. of water at 130°–140° F. Then approximately 10 cc. of 10% formaldehyde (25 cc. of approximately 37% formaldehyde by weight diluted to 250 cc. with water) were added. The bath was held at this temperature for twenty minutes and the dyeing was removed, rinsed and dried.

A preferred formaldehyde aftertreatment because of its ease of application is carried out at the end of the dyeing period by adding 10 cc. of 10% formaldehyde to the dyebath. After about twenty minutes at bath temperature, the dyeings are removed, rinsed and dried. In both cases the dyeing is a bright reddish-violet shade having excellent washing fastness. Its discharge, both alkaline and neutral, is superior to that of the dyes of violet shade specifically described in U. S. patent application Serial No. 293,568.

Deeper shades with better light fastness are produced by aftertreatment of this color with copper salts. This aftercoppering operation may be carried out by either of the procedures outlined above for the aftertreatment with formaldehyde by substituting for the 10 cc. of the formaldehyde solution an equal amount of 5% solution of hydrated cupric sulfate. In either case the operation is allowed to continue for twenty minutes, at the end of which time the treated dyeings are removed, rinsed and dried.

A further alternative procedure has been found to give a marked improvement in fastness properties, both to light and to washing. This consists in a combination of the formaldehyde and aftercoppering treatments. This aftertreatment operation may be done either in the dyebath or in a fresh bath as hereinbefore described. It consists in adding the formaldehyde solution as described, and after twenty minutes the copper sulfate is added. Twenty minutes thereafter the dyeings are removed, rinsed and dried. Water soluble salts of various metals can be used for metallizing the dyeing, those having atomic weights between 50 and 65 being most suitable.

This invention provides a bright reddish-violet direct dye which, when aftertreated with formaldehyde, shows excellent fastness to washing. It is superior in discharge, both neutral and alkaline, and in tinctorial power as compared to the previously disclosed dyes of this type which produce dyeings of similar shade. It has excellent affinity.

From the foregoing disclosure it will be recognized that the invention is susceptible of modification without departing from the spirit and scope thereof, and it is to be understood that the invention is not restricted to the specific embodiments described.

I claim:
1. A tetrakisazo dye which in its acid form is represented by the formula

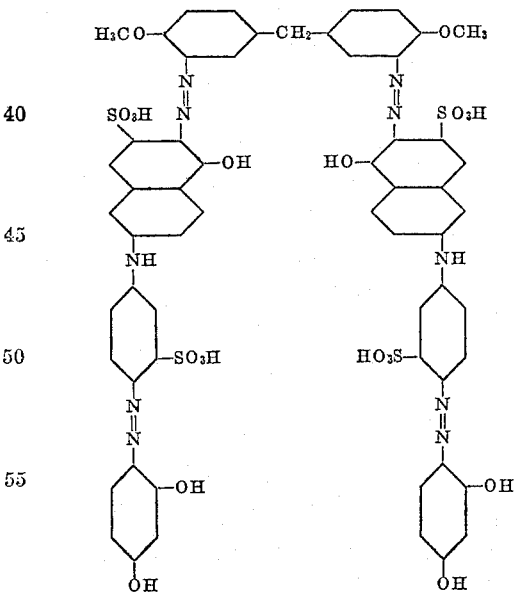

2. A metal and formaldehyde complex of the dye of claim 1, said metal having an atomic weight of 50 to 65.

3. The formaldehyde and copper complex of the dye of claim 1.

4. The formaldehyde complex of the dye of claim 1.

JOSEPH H. TREPAGNIER.